July 25, 1939.                J. CHUDNER                2,167,474
SHOCK ABSORBER
Filed Aug. 13, 1938
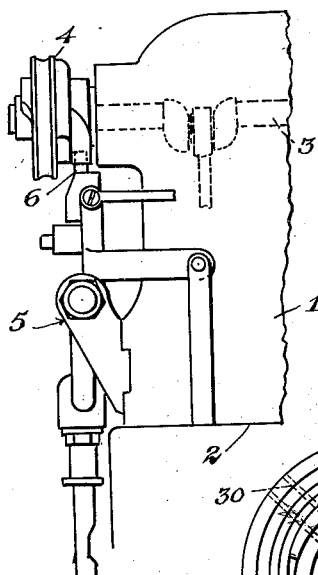
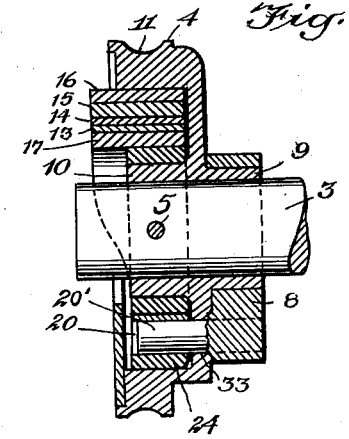
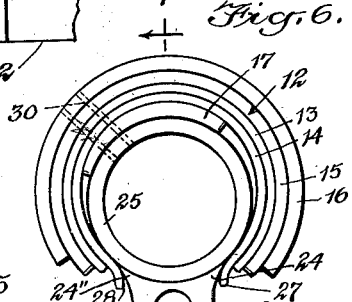
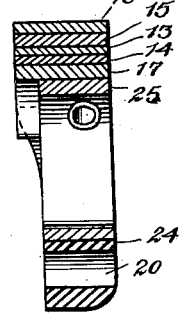
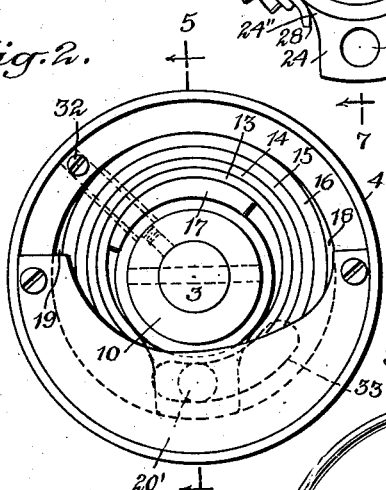
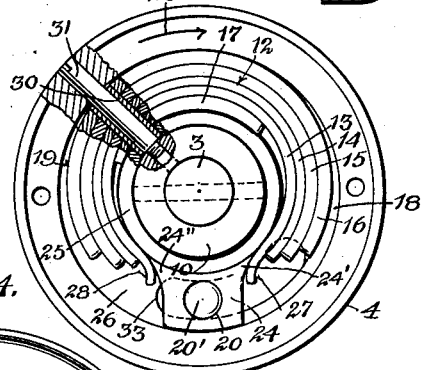
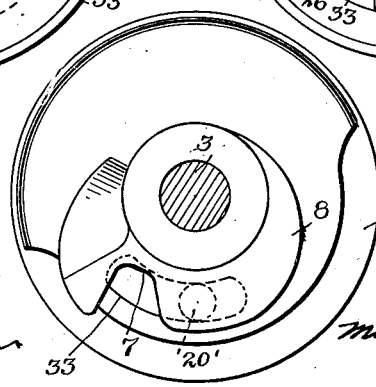
WITNESSES
INVENTOR
Joseph Chudner
BY
ATTORNEYS Patented July 25, 1939

2,167,474

UNITED STATES PATENT OFFICE 2,167,474

SHOCK ABSORBER

Joseph Chudner, Brooklyn, N. Y.

Application August 13, 1938, Serial No. 224,743

5 Claims. (Cl. 188—102)

This invention relates to an improved shock absorber which may be used in various kinds of machines and particularly in a drive pulley for buttonhole stitching machines, an object being to provide a simple strong construction which will not get out of order and which will function efficiently.

Another object of the invention is to provide a shock absorber for the drive pulleys of buttonhole stitching machines or other machines where the driven shaft is to stop suddenly, the parts being so arranged that the sudden stopping will be cushioned through the use of a leaf spring structure.

A further object, more specifically, is to provide a shock absorber wherein a group of leaf springs is in connection with an oscillating piston for giving a cushioning effect to a driven shaft when the same is stopped suddenly.

In the accompanying drawing—

Fig. 1 is a side view of part of a buttonhole stitching machine with a pulley and a stop machine device associated therewith;

Fig. 2 is an elevation of the pulley and associated parts shown in Fig. 1, the same being on an enlarged scale;

Fig. 3 is a view similar to Fig. 2 but showing the retaining plate removed and showing certain parts in section, illustrating how the group of springs is held connected to the pulley shell;

Fig. 4 is a view of the structure shown in Fig. 2 looking at the same from the opposite side, the shaft being shown in section;

Fig. 5 is a sectional view through Fig. 2 approximately on the line 5—5;

Fig. 6 is a side elevation of the leaf spring shown in Fig. 3 together with the piston;

Fig. 7 is a sectional view through Fig. 6 approximately on the line 7—7.

Referring to the accompanying drawing by numerals, 1 indicates the standard or upright of a buttonhole stitching machine of a standard well-known type. This machine is provided with a driven shaft 3 to which a shell 4 is secured by a pin 5, as illustrated in Figs. 2 and 3. Associated with the pulley or shell 4, which presents an embodiment of the invention, is a stop machine device of any desired kind, as for instance, the kind shown in United States Letters Patent No. 743,213. This construction forms no part of the present invention except in combination.

At the proper time for stopping the stitching machine the rod or pin 6 moves upwardly and enters into a notch 7 in a cam or member 8. This cam is rotatably mounted on the outer hub 9 of the shell 4, said outer hub being in line with the inner hub 10. The shaft 3 extends through these two hubs and preferably a short distance beyond the shell so that when the pin 5 is inserted the parts will be in proper functioning position. A belt (not shown) is applied to the groove 11 of shell 4 and when the shell 4 is rotated the shaft 3 will also be rotated.

In making buttonholes it is desirable to have the machine run as fast as possible and then stop quickly. To prevent an undesirable impact or jarring of the machine, a cushioning or impact softening device hereinafter fully described is used. Heretofore rubber bumpers and tensile coil springs have been used but these have disclosed certain undesirable characteristics particularly in regard to wearing out quickly. In the present invention means have been provided which will give the desired cushioning or softening effect but which will wear for an indefinite time.

As shown in the accompanying drawing, the device consists principally of a group 12 of arc-shaped springs arranged as leaf springs. As shown in the drawing there are three inner springs 13, 14 and 15 and one outer or rather heavy spring 16. The member 17 is preferably a stiff piece of metal on which the leaf springs are mounted. As clearly indicated in Figs. 3 and 6, the ends of the various springs are substantially in alignment and the plane of the ends is at right angles to a line drawn from the center of shaft 3 and the aperture 20 of lug 24.

As indicated in Figs. 3 and 6 particularly, a ring 25 is fixedly mounted on the hub 10 and on this ring is the slidably mounted lug 24 which has laterally protruding extensions 24' and 24" which project beneath the ends of spring 13. It will be observed that the inner spring 13 of the group 12 is provided with slightly outturned ends 27 and 28 so that as the lug 24 strikes either of these ends the blow will be cushioned as the strain would be transferred to the ends of adjacent springs. The springs and member 17 are all firmly connected together at one point by a hollow rivet or sleeve 30 which sleeve extends into the ring 25 as shown in Fig. 3. As indicated in Fig. 3, this sleeve is nearer one end of the group of springs than the other so that the end of the group of springs having the outturned ends 27 will flex to a greater extent than the other end. The principal strain or blow is taken up by that portion of the group of springs between the outturned ends 27 and the outer rivet 30. The rebound is taken up by the opposite end of the group of springs. When the lug 24 stops suddenly, as hereinafter fully described, the pulley or shell will continue to move as indicated by the arrow 29 but this movement is only for a short distance and will be cushioned by reason of the spring structure just described. During the cushioning action the ring 25 naturally rotates or slides a very short distance relative to the lug 24 and then there is a slight rebound after which the extending outturned ends 27 and 28 act to hold the lug 24 firmly against movement in either direction during the time that the mechanism is stationary. The springs also act to hold the lug 24 in place when the springs and associated parts are out of the pulley.

In forming and mounting the springs they are so constructed and arranged that they will be under tension or preloaded against lug 24; also the largest part of the springs is diametrically opposite the lug 24 and produces a counterbalance to the mechanism of the machine to which the shell 4 is connected. From Fig. 3 it will also be observed that there are provided clearances 18 and 19 to permit proper expansion of the respective ends of the group of springs when strain is brought to bear thereon.

It will therefore be noted that the shell 4, together with the group of springs 12, rotates as indicated by the arrow 29 in Fig. 3 so that when the lug 24 is stopped suddenly by pin 6, the ends 27 will function and the long portion of the group 12 will flex and the shorter portion will flex on the rebound. In order to accomplish this result the structure as illustrated in Fig. 3 is necessary, namely, the pin 31 which extends through the outer portion of the shell 4 through the hollow rivet 30 and into the hub 10. Preferably the inner end of pin 31 is screwed into the hub 10 so as to hold the same in place though the set screw 32 is utilized to prevent any accidental removal of the pin. By this construction it will be seen that the spring structure is firmly connected to the shell 4 and strain from the pulley is distributed to all of the springs simultaneously.

The stopping of the lug 24 is accomplished by the fact that the cam 8 is suddenly stopped when the pin 6 enters notch 7. Cam 8 is provided with a pin 20' extending through the aperture 20 and through an arc-shaped slot 33 formed in the rear wall of shell 4.

When the pin 6 is quickly elevated it enters the notch 7 and cam 8 stops instantly. This stops the movement of lug 24 but the shell 4, ring 25 and the group of springs 12 continue to move a short distance but is checked by the springs pressing against lug 24 and this checking action is yielding so that there will be a quick but shock-absorbing stop to the rotation of shaft 3 and parts actuated thereby.

It will be understood that the shaft 3 operates a needle-carrying member of any desired kind.

It will also be evident that the impact-absorbing springs of group 12 may not only be used with a buttonhole stitching machine but may be used with any desired machine wherein a shaft is to be stopped suddenly without unnecessary jar to the mechanism with which it is associated. Therefore, the expression "buttonhole stitching machine" is to be interpreted as covering any kind of machine wherein the group of springs 12 and associated parts will function as described.

I claim:

1. A stop mechanism comprising a shell having a peripheral belt groove and provided with an annular chamber inside the shell, a series of arc-shaped leaf springs positioned in said shell and arranged in a group fixed at one point to the shell, a ring positioned in said group of springs and secured thereto at one point, and an apertured lug projecting substantially to the wall of said chamber, said lug having flaring end portions projecting between the ends of said group of springs and said ring whereby the flaring end portions of said springs will soften the impact of the stopping operation.

2. A stop mechanism as claimed in claim 1, including a pin for connecting the springs at one point intermediate their length to the shell.

3. A stop mechanism as claimed in claim 1, including the arrangement of springs so that the ends of all of the springs will be substantially on a line at right angles to a line drawn from the center of the shell through the center of the apertured lug.

4. A stop mechanism comprising a shell having a peripheral belt groove, an annular chamber, an inner annular hub positioned centrally of the annular chamber, an outer annular hub positioned exteriorly of the shell and an arc-shaped slot spaced radially outwardly from the inner hub, a group of substantially arc-shaped leaf springs positioned in said chamber with their ends in a substantially straight line, means for securing said group of springs to said shell nearer one end of the springs than the other, a ring mounted on said annular hub, a radially disposed apertured lug slidingly engaging said ring projecting between the grouped ends of said springs to a point where the aperture therein will register with said slot, a cam rotatably surrounding said outer hub, said cam being formed with a notch, and a pin extending from said cam through the aperture in said lug for connecting said lug with said cam whereby said springs will cushion the impact of the stopping mechanism when said cam is stopped.

5. A stop mechanism as claimed in claim 4, including a sleeve for rigidly securing said springs together so as to hold the springs in a group formation whereby the group of springs may be readily placed in said chamber and removed therefrom.

JOSEPH CHUDNER.